(12) United States Patent
Bleyer et al.

(10) Patent No.: US 10,565,719 B2
(45) Date of Patent: Feb. 18, 2020

(54) FLOOR DETECTION IN VIRTUAL AND AUGMENTED REALITY DEVICES USING STEREO IMAGES

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Christopher Stephen Messer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/799,918

(22) Filed: Oct. 31, 2017

(65) Prior Publication Data

US 2019/0114797 A1 Apr. 18, 2019

Related U.S. Application Data

(60) Provisional application No. 62/572,354, filed on Oct. 13, 2017.

(51) Int. Cl.
*G06T 7/60* (2017.01)
*G06T 15/04* (2011.01)
(Continued)

(52) U.S. Cl.
CPC .............. *G06T 7/593* (2017.01); *G06F 16/56* (2019.01); *G06T 7/579* (2017.01); *G06T 7/70* (2017.01);
(Continued)

(58) Field of Classification Search
CPC ................................. G06T 15/04; G06F 16/56
(Continued)

(56) References Cited

U.S. PATENT DOCUMENTS 7,570,794 B2 * 8/2009 Swanger ............... G06T 7/0006
348/128
8,872,854 B1 10/2014 Levitt
(Continued)

FOREIGN PATENT DOCUMENTS

CA 2954714 A1 1/2016

OTHER PUBLICATIONS

Lobo, et al., "Vision and Inertial Sensor Cooperation Using Gravity as a Vertical Reference", In Proceedings of the IEEE Transactions on Pattern Analysis and Machine Intelligence, vol. 25, Issue 12, Dec. 1, 2003, pp. 1597-1608.
(Continued)

*Primary Examiner* — Dwayne D Bost
*Assistant Examiner* — Stephen M Brinich
(74) *Attorney, Agent, or Firm* — Newport IP, LLC; Leonard J. Hope

(57) ABSTRACT

A first image and a second image of a scene are obtained for use in detecting the location of the floor in the scene. A first of the images is mapped onto a candidate plane that is perpendicular to a gravity vector, thereby creating a texture-mapped plane. The texture-mapped plane is projected into the geometry of the camera utilized to take the second image to create an artificial first image. A comparison is then performed between the first image and the artificial first image to generate a similarity score. Multiple candidate planes are processed in this manner for the first and second images, and the candidate plane generating the highest associated similarity score is chosen as the floor. This process can be repeated for multiple sets of stereo images.

20 Claims, 10 Drawing Sheets

(51) Int. Cl.
  *G06T 7/593* (2017.01)
  *G06T 7/73* (2017.01)
  *G06T 7/579* (2017.01)
  *G06T 7/70* (2017.01)
  *G06F 16/56* (2019.01)

(52) U.S. Cl.
  CPC ............... *G06T 7/75* (2017.01); *G06T 15/04* (2013.01); *G06T 2207/10012* (2013.01); *G06T 2207/10021* (2013.01); *G06T 2207/10024* (2013.01); *G06T 2207/30244* (2013.01); *G06T 2215/16* (2013.01)

(58) Field of Classification Search
  USPC ............... 382/152–154, 195, 100, 106, 108
  See application file for complete search history.

(56) References Cited

U.S. PATENT DOCUMENTS

| | | |
|---|---|---|
| 9,645,397 B2 | 5/2017 | da Veiga et al. |
| 2016/0027213 A1 | 1/2016 | Burns et al. |
| 2016/0034746 A1* | 2/2016 | Harada .............. G06K 9/00201 382/154 |
| 2016/0300340 A1 | 10/2016 | Gupta et al. |
| 2016/0317811 A1 | 11/2016 | Greenberg et al. |
| 2017/0011519 A1 | 1/2017 | Ohba et al. |

OTHER PUBLICATIONS

"International Search Report and Written Opinion Issued in PCT Patent Application No. PCT/US2018/054492", dated Feb. 5, 2019, 9 Pages.

Chun, et al., "Floor Detection Based Depth Estimation from a Single Indoor Scene", In Proceedings of 20th IEEE International Conference on Image Processing, Sep. 15, 2013, pp. 3358-3362.

Tomori, et al., "Active Segmentation in 3D using Kinect Sensor", In Proceedings of 20th International Conference Computer Graphics, Visualization and Computer Vision, Jun. 26, 2012, 5 Pages.

* cited by examiner

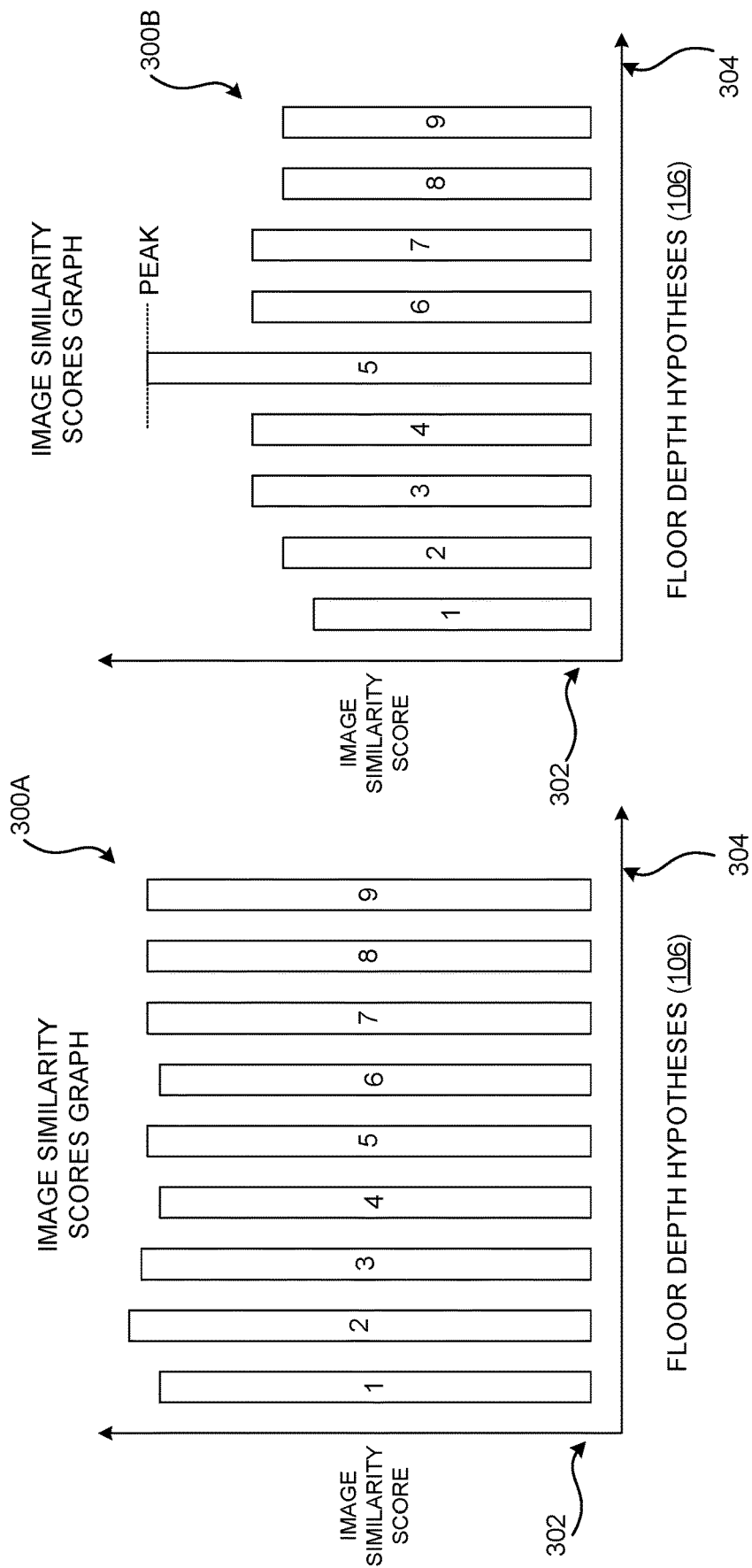

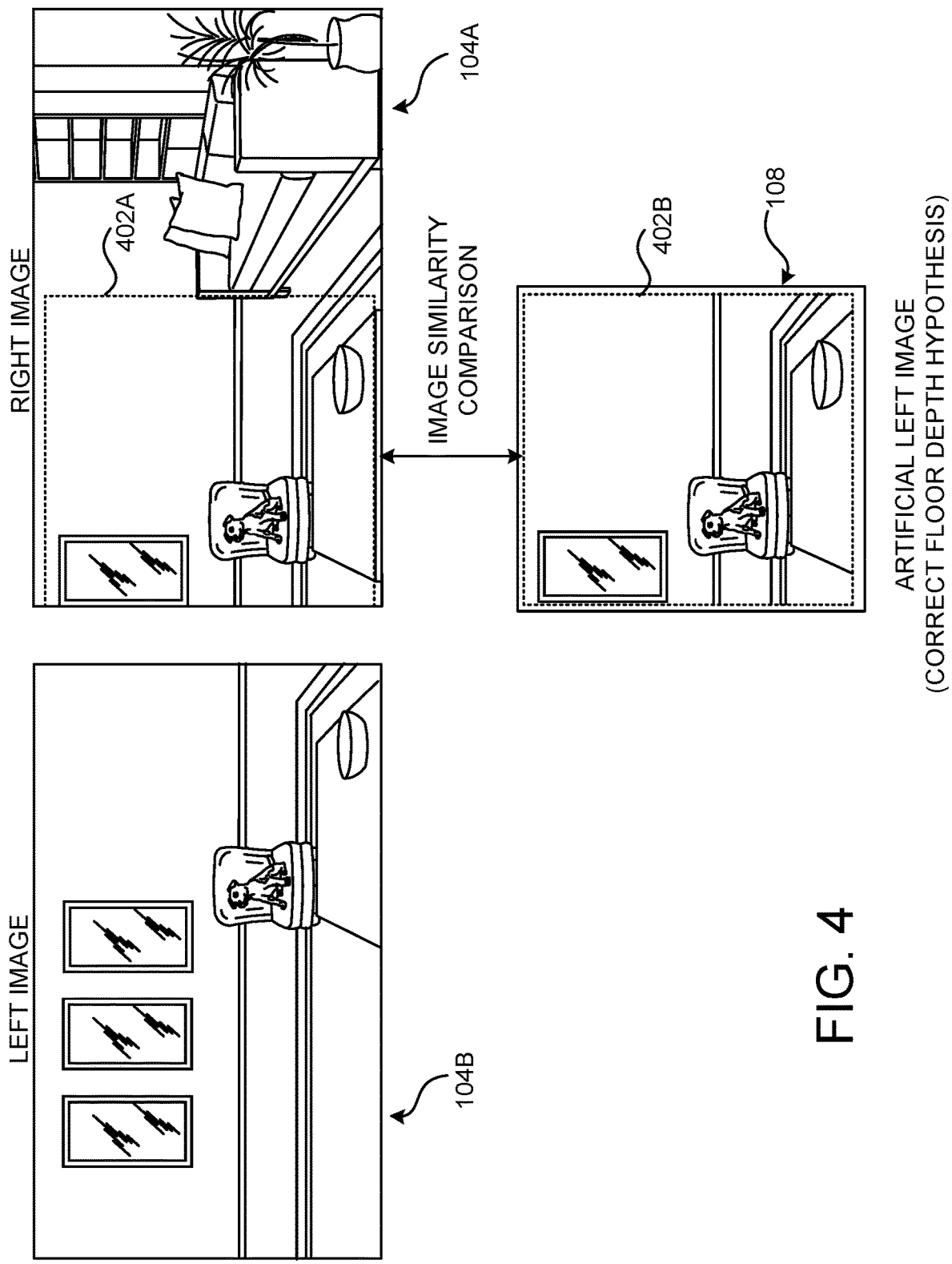

FLOOR DETECTION IN VIRTUAL AND AUGMENTED REALITY DEVICES USING STEREO IMAGES

PRIORITY INFORMATION

This application claims the benefit of U.S. Provisional Patent Application No. 62/572,354, filed Oct. 13, 2017 and entitled "Floor Detection in Virtual and Augmented Reality Devices Using Stereo Images," which is expressly incorporated herein by reference in its entirety.

BACKGROUND

Virtual reality ("VR") devices enable users to view and interact with virtual environments. For example, a VR device might enable a user to explore a virtual environment. Augmented reality ("AR") devices enable users to view and interact with virtual objects while simultaneously viewing the physical world around them. For example, an AR device might enable a user to view the placement of virtual furniture in a real-world room. Devices that enable both VR and AR experiences might be referred to as mixed reality ("MR") devices. VR devices, AR devices, and MR devices are also commonly referred to as near-eye devices ("NED").

In AR and VR devices it is commonly necessary to detect the height of a three-dimensional ("3D") plane corresponding to the real-world floor of the room in which a user is using a device. Locating the real-world floor is important for comfortable and immersive VR and AR experiences, as accurate detection of the real-world floor allows the placement of the floor in a VR scene at a location that seems natural to a user. In an AR scenario, accurate detection of the real-world floor enables virtual objects to be presented at the proper location with reference to the real-world floor.

Inaccurate identification of the floor can also lead to less immersive AR and VR experiences. For instance, if the height of the floor is computed incorrectly, a user might appear to be floating above or walking below the virtual floor. Virtual objects might also be placed incorrectly such as, for instance, placing furniture in mid-air or below the real-world floor. Additionally, if the virtual floor is misaligned, a user might be unable to pick up virtual objects off the virtual floor or might strike the real-world floor with a handheld controller. A user might also stumble or fall, particularly in VR environments, if the virtual floor is displayed at an incorrect location.

Current mechanisms for detecting the real-world floor commonly misidentify the location of the real-world floor. For instance, one mechanism first asks the user to hold their device pointed toward a computer, such as a desktop computer. The location of the floor (i.e. the floor depth) is then set using an approximation of the user's seated head height (e.g. 48 inches). As a result, if the user is at a standing desk or in another standing position, the location of the virtual floor will be incorrectly set to somewhere near the user's knees. Other mechanisms for setting the height of the real-world floor require users to manually input their height or the device height, which can also be problematic.

Setting the floor depth incorrectly in the manner described above can cause the human-machine interface to operate inaccurately, which commonly results in the user having to repeat the floor detection procedure. Repeating the floor detection procedure can, however, waste valuable computing resources, such as processor cycles and battery power. Moreover, erroneous user input might be provided to a device as a result of inaccurate floor detection such as, for instance, a user interacting with a virtual object that has been placed at an incorrect location in the virtual world. This might also result in inefficient usage of processing resources in addition to a frustrating user experience.

It is with respect to these and potentially other considerations that the disclosure made herein is presented.

SUMMARY

Technologies are disclosed herein for floor detection in VR and AR devices using stereo images. Using implementations of the disclosed technologies, VR and AR devices can automatically and accurately detect the height of a 3D plane that corresponds to the real-world floor. As a result, a human-machine interface can be provided that is more accurate than devices utilizing current mechanisms for floor detection. This can result in the reduction of erroneous user input to AR and VR devices and, consequently, reduce the utilization of computing resources like processor cycles and battery power.

Implementations of the disclosed technologies might also result in a more accurate and immersive user experience as compared to AR and VR devices that utilize current mechanisms for floor detection. Among other benefits, a more accurate and immersive user experience might reduce the likelihood that a user will stumble or fall while interacting with the VR or AR environment.

The mechanisms disclosed herein can also detect the floor more efficiently than previous methods for floor detection and without user input, thereby also reducing the use of computing resources as compared to previous solutions. The disclosed mechanisms also reduce the possibility that a user will have to repeat a floor detection procedure or repeat erroneous user input, both of which can reduce the utilization of computing resources as compared to previous solutions. Technical benefits other than those specifically described herein might also be realized through implementations of the disclosed technologies.

In order to provide the technical benefits described above, and potentially others, a first image is taken of a scene at a first location, and a second image is taken of the scene at a second location. The images can be generated, for example, by two outward-facing cameras in a VR device, an AR device, an MR device, or another type of device. The first and second images have overlapping fields of view and can be taken by two different cameras or a single camera placed in two different locations. The first and second images together might be referred to herein as a "stereo image pair."

Multiple planes (referred to herein as "candidate planes" or "floor depth hypotheses") are then evaluated to determine if one of the planes corresponds to the floor of the scene. The candidate planes are perpendicular to a gravity vector. In some configurations, candidate planes located above the head of a user are not evaluated as these planes cannot represent the floor. In some configurations, pixels in the first image and the second image are invalidated that correspond to an angle of the camera being higher than a predetermined angle. In this way, pixels that cannot be representative of the floor are not processed. This also can assist with preventing false identification of other horizontal planar surfaces, like a table, that are not the floor.

In order to evaluate each candidate plane, the first image is mapped onto the candidate plane to create a texture-mapped 3D plane. The texture-mapped 3D plane is then projected into the geometry of the camera used to capture the second image to create an artificial second image. A score of image similarity is then computed based upon the detected similarity between the second image and the artificial second image. In one configuration, the score of image similarity is generated using normalized cross correlation. Other measures of image similarity can be utilized in other configurations.

Once the score of image similarity has been computed for each of the candidate planes, the candidate plane having the highest score of image similarity between the second image and the artificial second image is chosen as the 3D plane corresponding to the floor. This process can be repeated for multiple stereo image pairs to increase the confidence that the 3D plane corresponding to the floor has been chosen correctly.

It should be appreciated that the subject matter described briefly above and in further detail below can be implemented as a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, minicomputers, mainframe computers, handheld computers, smartphones, personal digital assistants, smart watches, e-readers, tablet computing devices, special-purposed hardware devices, network appliances, and the like.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a bar chart showing aspects of several example image similarity scores graphs that are computed and utilized in various configurations disclosed herein;

FIG. 3B is a bar chart showing aspects of several example image similarity scores graphs that are computed and utilized in various configurations disclosed herein;

FIG. 4 shows example left and right stereo images taken by cameras in a VR or AR device along with aspects of the generation of an artificial image that is utilized for floor detection in configurations disclosed herein.

DETAILED DESCRIPTION

The following Detailed Description describes technologies for floor detection in VR devices, AR devices, and other types of devices using stereo images. As discussed above, various important technical benefits can be realized through implementation of the disclosed technologies. For example, and as discussed briefly above, implementations of the disclosed subject matter might reduce the likelihood that a user will stumble or fall while interacting with a VR or AR environment.

Implementations of the disclosed subject matter might also reduce the utilization of computing resources like processor cycles and battery power by more efficiently computing floor depth, reducing device setup time, reducing the possibility that a user will have to repeat a floor detection procedure, and providing an improved human-machine interface that is less prone to user input errors and that provides an improved user experience. Technical benefits other than those specifically described herein might also be realized through implementations of the disclosed technologies.

Turning now to the figures (which might be referred to herein as a "FIG." or "FIGS."), additional details will be provided regarding the technologies disclosed herein for computing floor depth using stereo images with reference to the accompanying drawings that form a part hereof. The FIGS. show, by way of illustration, specific configurations or examples. Like numerals represent like or similar elements throughout the FIGS.

In the FIGS., the left-most digit(s) of a reference number identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

Figure 1A:
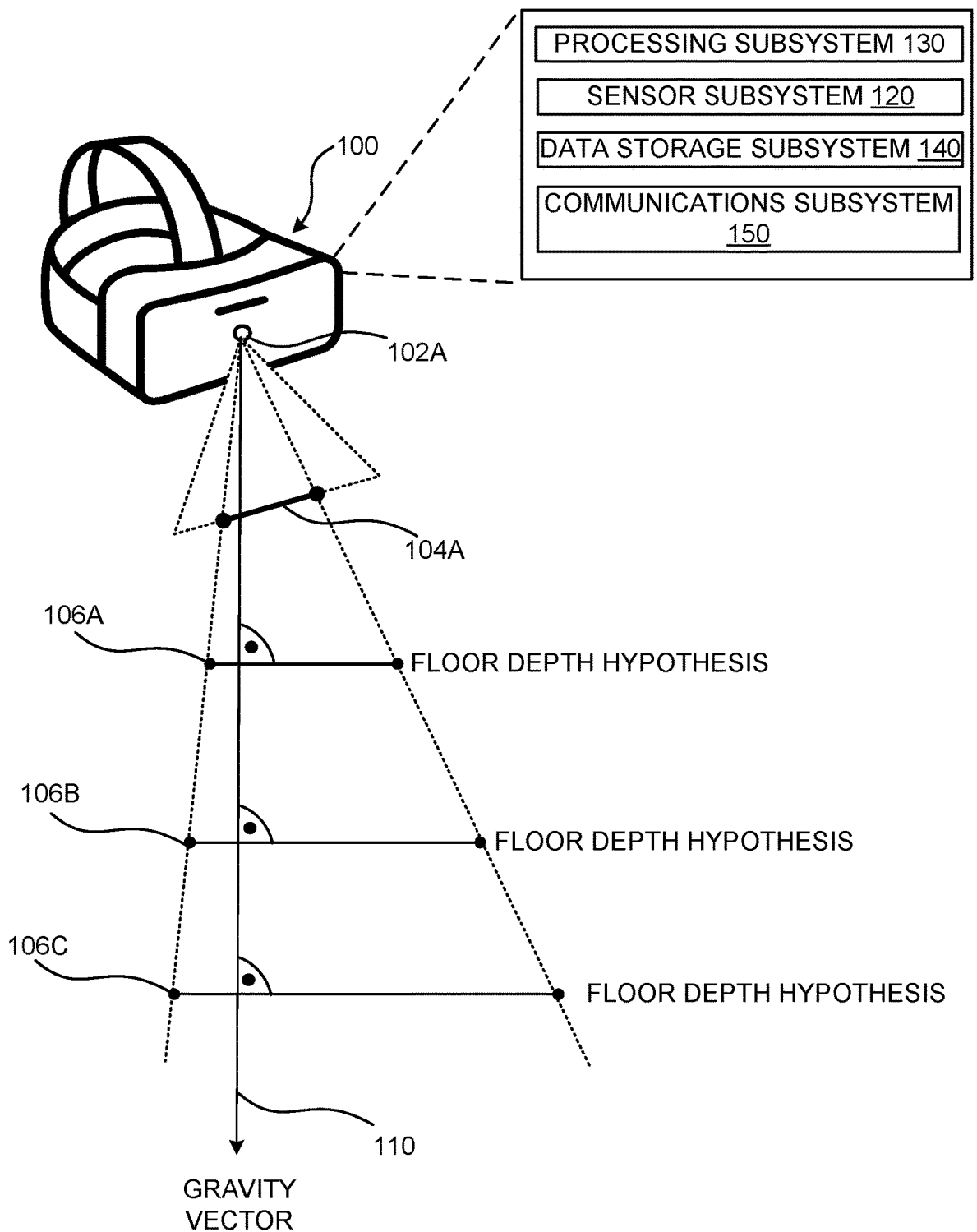
FIG. 1A is a computing device diagram showing aspects of the configuration and operation of a VR device that can be utilized to implement the various configurations disclosed herein for floor detection using stereo images.
Figure 1B:
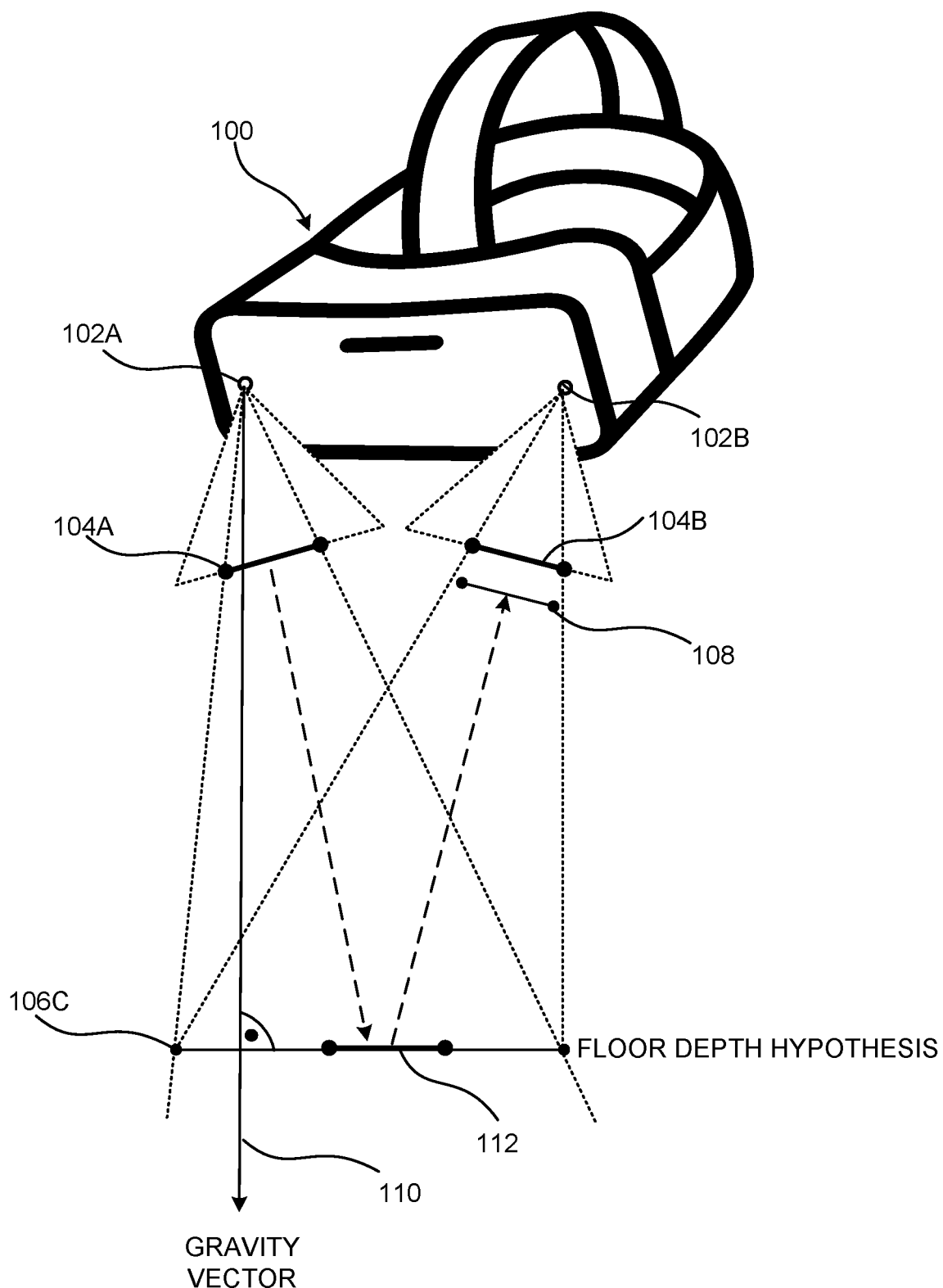
FIG. 1B is a computing device diagram showing aspects of the configuration and operation of a VR device that can be utilized to implement the various configurations disclosed herein for floor detection using stereo images.
Figure 1C:
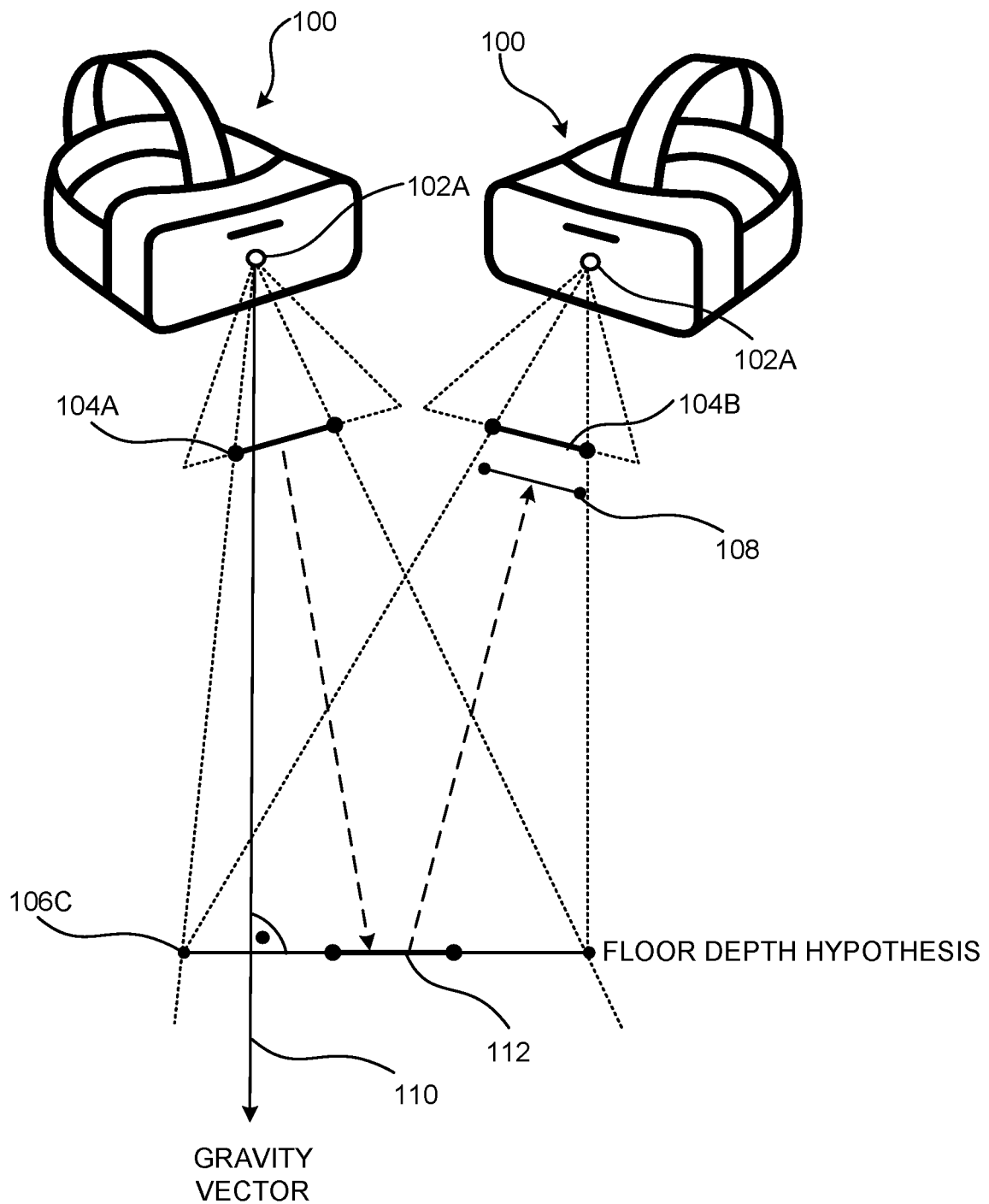
FIG. 1C is a computing device diagram showing aspects of the configuration and operation of a VR device that can be utilized to implement the various configurations disclosed herein for floor detection using stereo images.
Figure 2A:
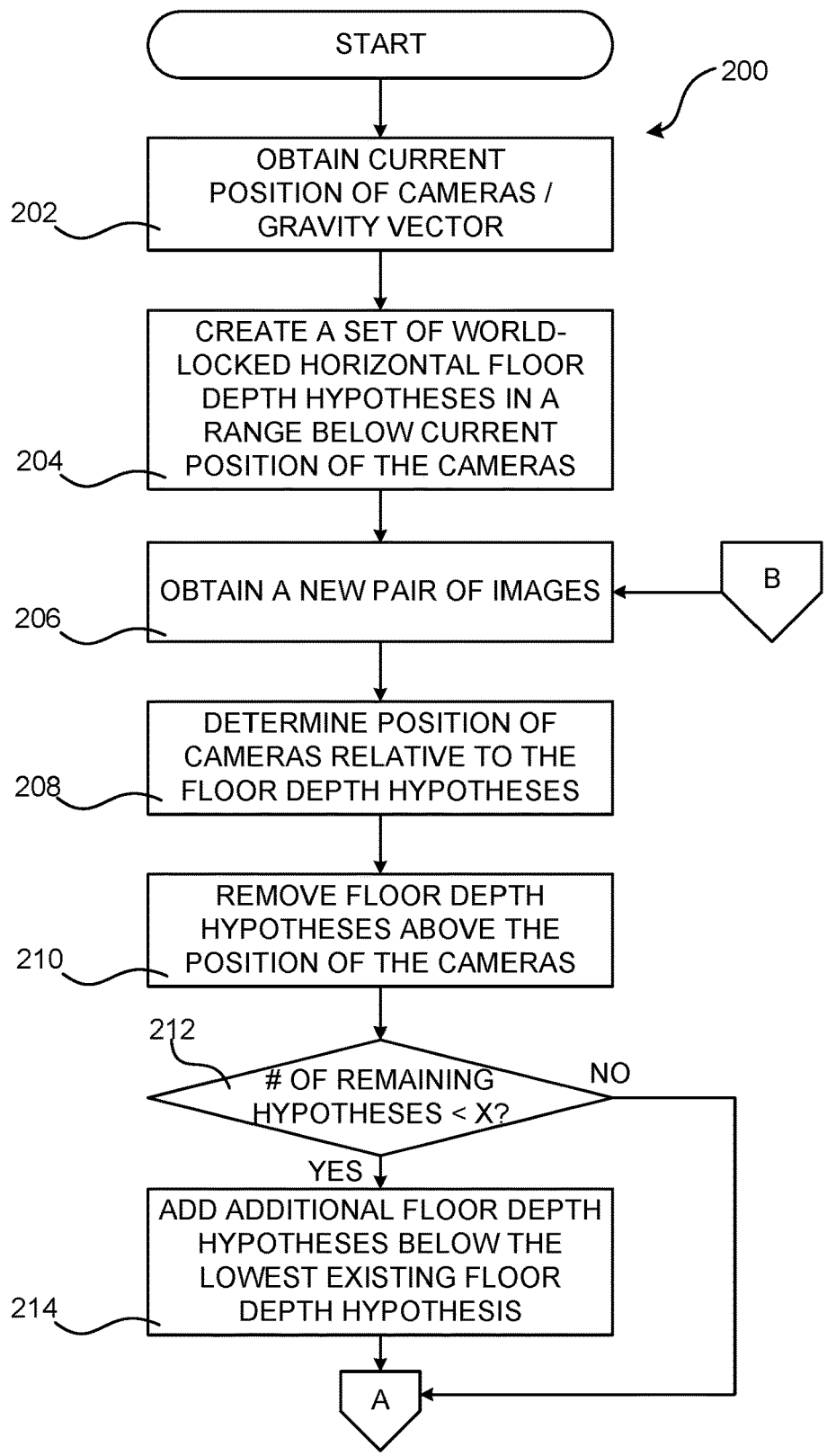
FIG. 2A is a flow diagram showing aspects of a routine disclosed herein for floor detection in AR and VR devices using stereo images, according to one configuration.
Figure 2B:
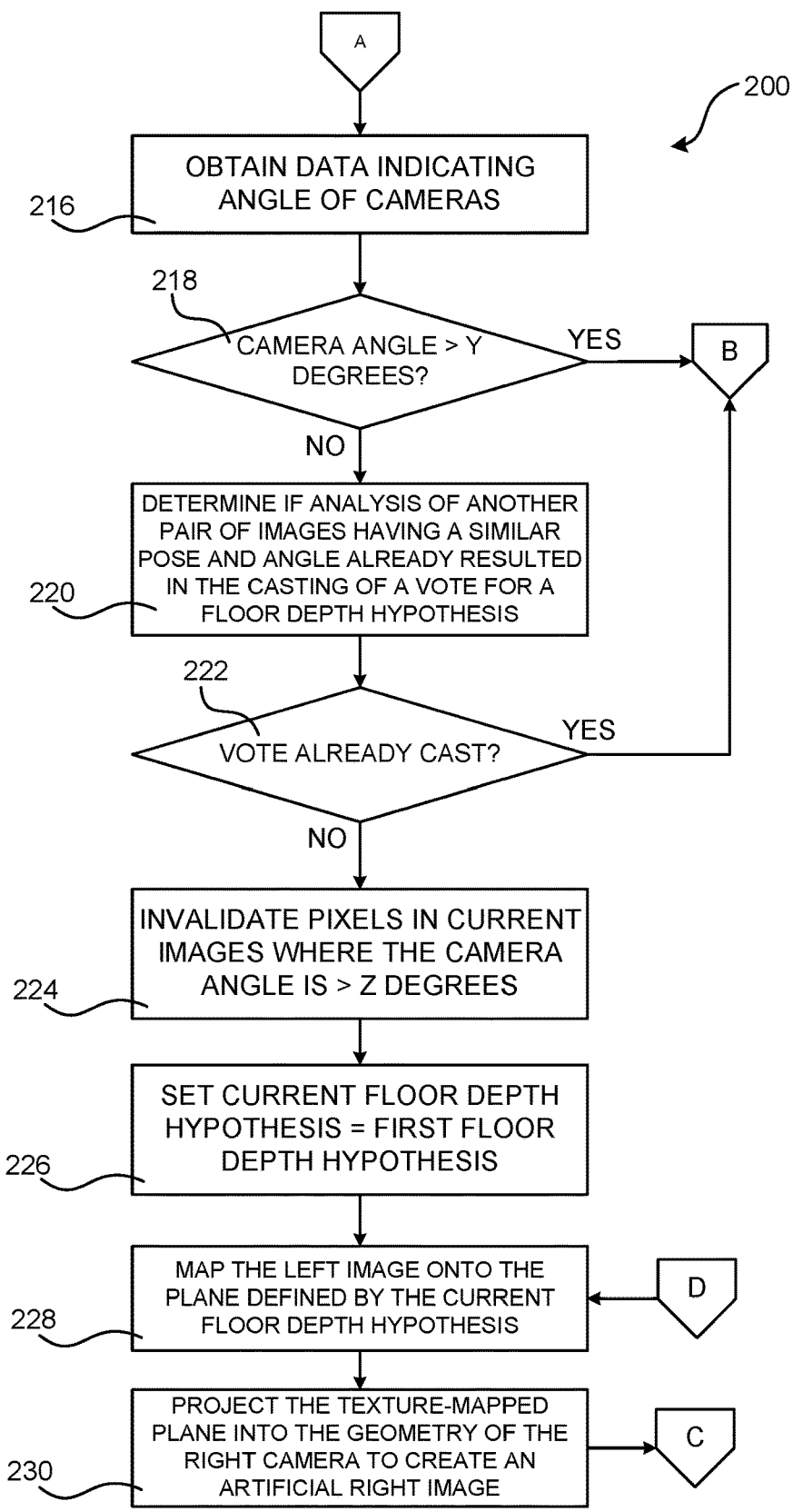
FIG. 2B is a flow diagram showing aspects of a routine disclosed herein for floor detection in AR and VR devices using stereo images, according to one configuration.
Figure 2C:
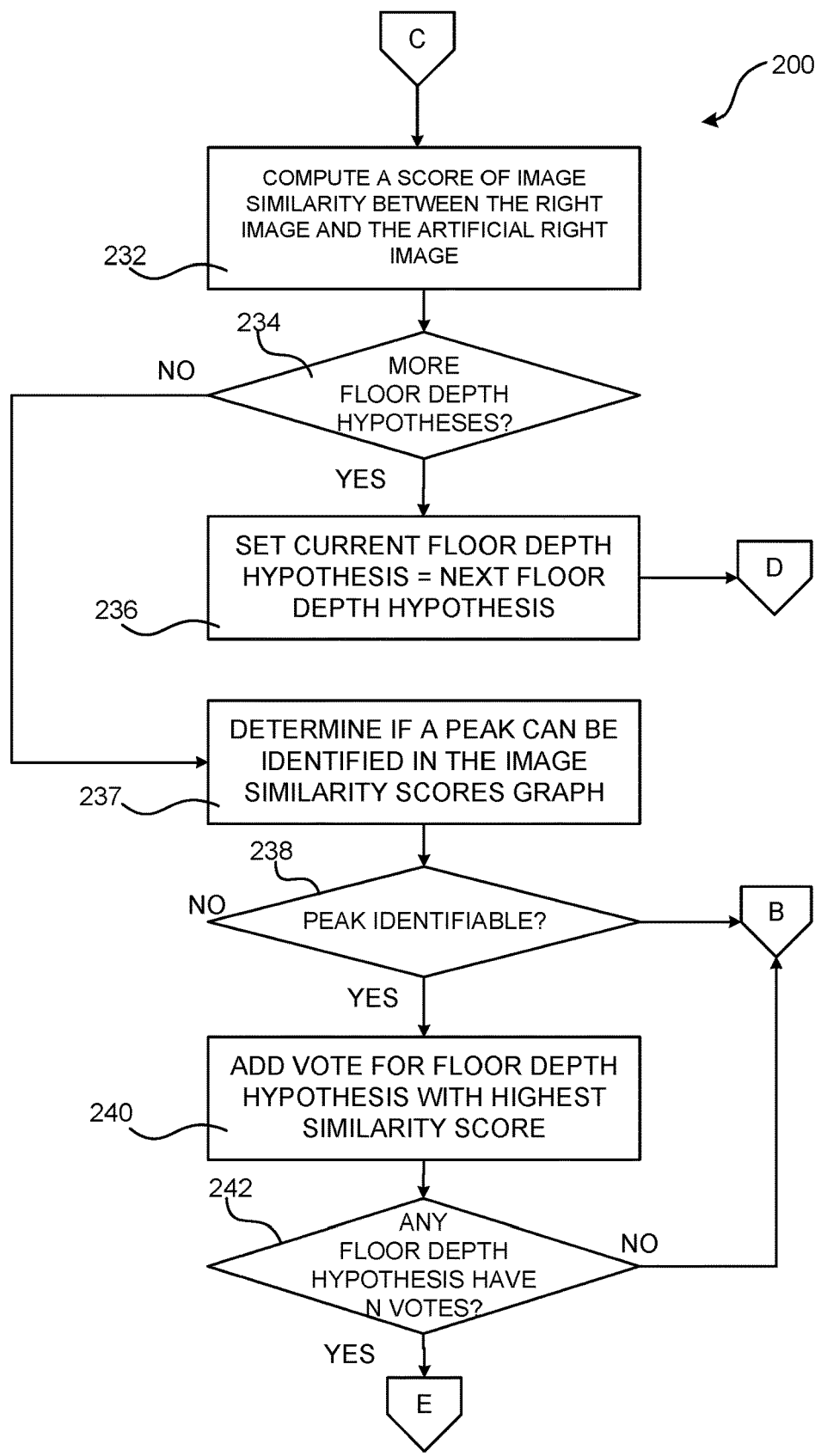
FIG. 2C is a flow diagram showing aspects of a routine disclosed herein for floor detection in AR and VR devices using stereo images, according to one configuration.
Figure 2D:
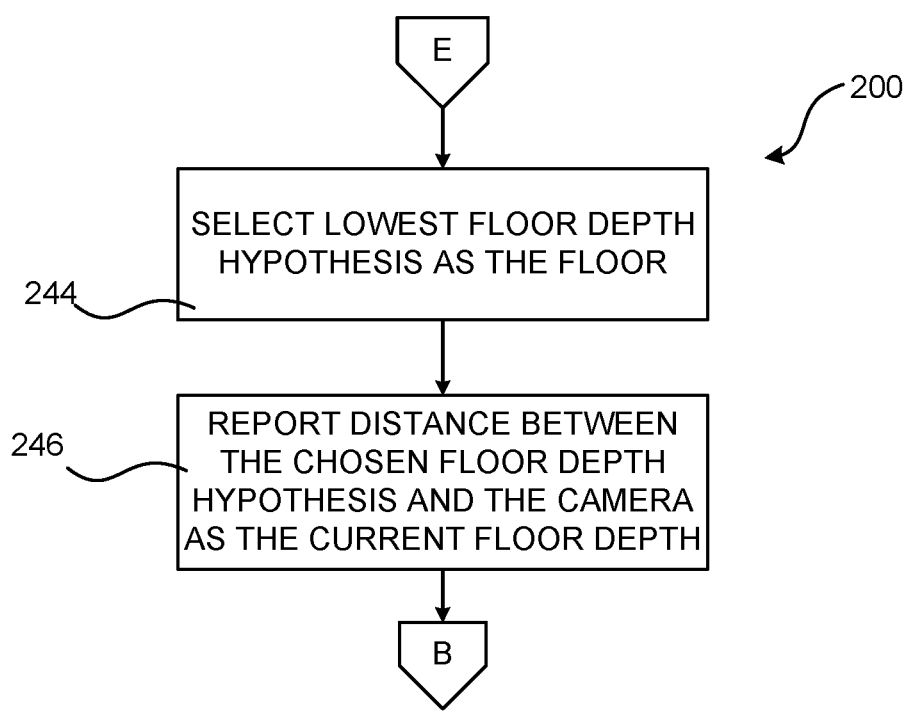
FIG. 2D is a flow diagram showing aspects of a routine disclosed herein for floor detection in AR and VR devices using stereo images, according to one configuration.

FIGS. 1A-1C are computing device diagrams showing aspects of the configuration and operation of a VR device 100 that can be utilized to implement the various technologies disclosed herein for floor detection using stereo images.

The VR device 100, alone or in combination with one or more other devices (e.g. a local computer or one or more remotely-located server computers), might form a system that performs or otherwise implements the various processes and techniques described herein.

In the configuration shown in FIGS. 1A-1C, the VR device 100 takes the form of a wearable, head-mounted display device that is worn by a user. It will be understood, however, that the VR device 100 might take a variety of different forms other than the specific configuration depicted in FIGS. 1A-1C.

As discussed in greater detail below, the technologies disclosed herein can also be utilized with AR devices, such as the AR device 500 shown in FIG. 5 and described below. Although the configurations disclosed herein are discussed primarily in the context of AR and VR devices, it is to be appreciated that the technologies disclosed herein can also be utilized with MR devices and other types of devices that include at least one camera such as, but not limited to, smartphones, video game systems, tablet computing devices, and smartwatches.

The VR device 100 includes one or more display panels (not shown in FIG. 1) that display computer generated ("CG") graphics. For example, the VR device 100 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user, and provide both right-eye and left-eye viewing via right-eye and left-eye viewing regions of the unitary display panel. In each of these implementations, the ability of the VR device 100 to separately display different right-eye and left-eye graphical content via right-eye and left-eye displays might be used to provide a user of the VR device 100 with a stereoscopic viewing experience.

The VR device 100 might include a variety of on-board sensors forming a sensor subsystem 120. For example, and without limitation, the sensor subsystem 120 might include one or more outward facing optical cameras 102 (e.g., cameras located on an external surface of the VR device 100 and forward facing in a viewing direction of the user), such as the optical camera 102A shown in FIG. 1. The VR device 100 can also include one or more inward facing optical cameras (not shown in FIG. 1) (e.g., rearward facing toward the user and/or toward one or both eyes of the user).

The sensor subsystem 120 can also include a variety of other sensors (not shown in FIG. 1) including, but not limited to, accelerometers, gyroscopes, magnetometers, environment understanding cameras, depth cameras, inward or outward facing video cameras, microphones, ambient light sensors, and potentially other types of sensors. Data obtained by the sensors, including the cameras 102, of the sensor subsystem 120 can be utilized to detect the location, orientation (which might be referred to as a "pose"), and movement of the VR device 100. The location, orientation, and movement of the VR device 100 can be utilized to compute the view of the VR environment presented to the user by the VR device 100.

The one or more outward facing optical cameras 102 of the VR device 100 can be configured to observe the real-world environment and output digital images illustrating the real-world environment observed by the one or more outward facing optical cameras 102. The optical cameras 102 are black and white ("B&W") cameras in one particular configuration. It is to be appreciated, however, that other types of cameras 102 can be utilized in other configurations such as, but not limited to, red-green-blue ("RGB") cameras and infrared cameras. Additionally, and as mentioned above, the same cameras 102 can be utilized for head tracking and for computing the depth of the real-world floor in the manner disclosed herein. Therefore, it is unnecessary to add additional cameras to VR (and AR) devices already equipped with outward facing cameras in order to implement the technologies disclosed herein.

The VR device 100 might also include a processing subsystem 130 that includes one or more processor devices that perform some or all of the processes or operations described herein, as defined by instructions executed by the processing subsystem 130. Such processes or operations might include generating and providing image signals to the display panels, receiving sensory signals from sensors in the sensor subsystem 120 such as the cameras 102, enacting control strategies and procedures responsive to those sensory signals, and computing the depth of a real-world floor in the manner described herein. Other computing systems, such as local or remote computing systems might also perform some or all of the computational tasks disclosed herein.

The VR device 100 might also include an on-board data storage subsystem 140 that includes one or more memory devices storing computer-executable instructions (e.g., software and/or firmware) executable by the processing subsystem 130, and might additionally hold other suitable types of data. The VR device 100 might also include a communications subsystem 150 supporting wired and/or wireless communications with remote devices (i.e., off-board devices) over a communications network (not shown in FIG. 1). As an example, the communication subsystem 150 might be configured to wirelessly send or receive a video stream, audio stream, coordinate information, virtual object descriptions, and/or other information from remote devices to render virtual objects and textures on the integrated displays of the VR device 100. Examples of VR devices include, but are not limited to, the HTC VIVE VR device and the OCULUS RIFT VR device.

In the example shown in FIG. 1A, a single camera 102A records a two-dimensional ("2D") image 104A of the floor in the real world. The floor is assumed to be perpendicular to a gravity vector 110. The gravity vector 110 is a vector representing the direction that things appear to fall from the perspective of an observer fixed with respect to the center of the Earth. The gravity vector 110 can be identified using an accelerometer in the sensor subsystem 120.

In the various configurations disclosed herein, the floor is assumed to be a plane that is perpendicular to the gravity vector 110. Additionally, the height of the floor is assumed to be lower than the height of the user wearing the VR device 100 (e.g. the height of the VR device 100). In view of these assumptions, a number of floor depth hypotheses 106A-106C (which might also be referred to herein as "depth hypotheses" or "candidate planes") can be created. The depth hypotheses 106 represent depths along the gravity vector 110 measured from the height of the VR camera 102A.

Because the depth hypotheses 106 are perpendicular to the gravity vector 110, a one-dimensional ("1D") search of possible depths along the gravity vector 110 can be performed to identify the depth hypothesis 106 that most likely corresponds to the location of the real-world floor. It is not possible, however, to select a depth hypothesis 106 that corresponds to the floor using only a single 2D image 104A as input. A depth hypothesis 106 can, however, be selected using two 2D images 104 (which might be referred to herein as "left and right images" or "stereo images") of the floor. Details regarding this implementation will be provided below with regard to FIGS. 1A and 1B.

In the example shown in FIG. 1B, the VR device 100 includes two cameras 102A and 102B. The cameras 102A and 102B are used to track orientation and location of the VR device 100 (commonly referred to as "head tracking"). To maximize the field of view of the cameras 102A and 102B, the two cameras 102A and 102B can have a large baseline and can be oriented such that they face away from each other with an overlap in the field of view ("FOV") of each camera that can be used for triangulation. The cameras 102A and 102B are also calibrated intrinsically and extrinsically. This is typically done at the time the VR device 100 is manufactured.

Computing depth from stereo images 104 and running surface reconstruction can be used to reconstruct 3D information about the user's environment and to detect the 3D location of the floor. However, given the camera setup described above, the results of surface reconstruction from the stereo images 104 tend to be of very low quality. This is especially true since frequently the cameras 102A and 102B in VR devices 100 are of low quality in order to save monetary costs. This is also exacerbated by the fact that the images obtained from the cameras 102A and 102B can have low resolution and can show a large amount of noise. The mechanism described herein can consume images 104A and 104B from the cameras 102A and 102B, respectively, and accurately compute the location of the floor despite the suboptimal camera input described above.

As mentioned above, the VR device 100 can include two (or more) outward-facing cameras 102A and 102B (which might be referred to herein as "the right camera" and "the left camera," respectively), which are located at different locations (e.g. on the front left side and the front right side of the VR device 100). In order to compute the depth of the real-world floor, an image 104A (which might be referred to herein as "the right image") can be captured by the right camera 102A. An image 104B (which might be referred to herein as "the left image") can also be captured by the left camera 102B.

The image 104A captured by the right camera 102A can then be texture mapped onto a candidate plane 106, for example the candidate plane 106C in the example shown in FIG. 1B. This results in a texture-mapped 3D plane 112. Once the texture-mapped 3D plane 112 has been generated, the texture-mapped 3D plane can be projected into the geometry of the left camera 102B. This results in an artificial left image 108.

If the candidate plane 106C is the floor, the left image 104B generated by the camera 102B should be very similar to the artificial left image 108. Various algorithms can be utilized in order to determine the similarity between the left image 104B and the artificial left image 108. For example, and without limitation, normalized cross correlation ("NCC") can be used to compute a score of image similarity between the left image 104B and the artificial left image 108. Other techniques can be used in other configurations. For example, and without limitation, the sum of absolute intensity differences, the sum of squared intensity differences, the sum of truncated distances, and other types of algorithms can be utilized. Details regarding the use of NCC to determine the similarity between the left image 104B and the artificial left image 108 will be provided below.

The process described above can be repeated for each candidate plane 106 and each pair of images 104A and 104B, thereby computing an image similarity score for each candidate plane 106. The process described above can also be repeated for a number of images 104A and 104B taken from different locations in the user's environment.

Once the process described above has been performed for a number of stereo images taken at different locations, the depth of the candidate plane 106 having the highest image similarity score can then be selected as the depth of the floor. The depth of the floor can then be reported to other subsystems in the VR device 100 for use in various ways, some of which have been described above. For example, displaying a virtual floor in a virtual environment at the depth of the actual floor or computing the location of virtual objects with reference to the depth of the actual floor.

It is to be appreciated that although the example given above compares the left image 104B to the artificial left image 108, the same process can be utilized with the right image 104A. It is also to be appreciated that the mechanism described above is not limited to use with a VR device 100 having two or more cameras. Rather, the mechanism described above can be utilized with a VR device 100 having a single camera 102. This can be accomplished by taking a first image of the floor and then moving the VR device 100 to obtain a second image of the floor from a different direction. This process can be referred to as "moving stereo."

Aspects of one mechanism for computing the floor depth using moving stereo is illustrated in FIG. 1C, where the VR device 100 has only a single camera 102A. In this example, the VR device 100 has been utilized to take an image 104A from one location and then has been moved to take an image 104B from another location. Once the images 104A and 104B have been captured in this way, the mechanism described above can be utilized to compute the depth of the floor.

FIGS. 2A-2D are flow diagrams showing aspects of a routine 200 disclosed herein for floor detection in VR devices 100 and AR devices, such as the AR device 500 described below with regard to FIG. 5, using stereo images, according to one configuration. The routine 200 is described with reference to the elements shown in FIGS. 1A-1C, 3A-3B, and 4.

The routine 200 is illustrated as a collection of blocks in a logical flow graph, which represent a sequence of operations that can be implemented in hardware, software, or a combination thereof. In the context of software, the illustrated blocks represent computer-executable instructions that, when executed by one or more processors, perform the recited operations.

Generally, computer-executable instructions include routines, programs, objects, components, data structures, and the like that perform or implement particular functions. The order in which operations are described herein is not intended to be construed as a limitation, and any number of the described blocks can be combined in any order and/or in parallel to implement the disclosed processes. Other processes described throughout this disclosure shall be interpreted accordingly.

The routine 200 begins at operation 202, where the current position and orientation of the cameras 102A and 102B is obtained from the sensor subsystem 120. The gravity vector 110 is also obtained from the sensor subsystem 120. The routine 200 then proceeds from operation 202 to operation 204.

At operation 204, a set of world-locked horizontal floor depth hypotheses 106 are created. The floor depth hypotheses 106 are created in a range below the current position of the cameras 102A and 102B. In one configuration the first floor depth hypothesis 106 in the range is created at the location (e.g. d=0 mm) of the user's head (i.e. the current position of the cameras 102A and 102B). Additional floor depth hypotheses 106 are then created between the first floor depth hypothesis 106 and a predefined point, for instance d=2000 mm. 2000 mm, or another value, can be chosen because a user of the VR device 100 is not likely to be taller than that value. The additional floor depth hypotheses 106 can be created every 20 mm, or another value, within the range from the minimum value (e.g. d=0 mm) and the maximum value (e.g. d=2000 mm). Other mechanisms can be used in other configurations to generate the candidate planes 106.

From operation 204, the routine 200 proceeds to operation 206, where a new pair of images 104A and 104B are obtained from the cameras 102A and 102B, respectively. The routine 200 then proceeds from operation 206 to operation 208, where the position of the cameras 102 relative to the floor depth hypotheses 106 is determined. The routine 200 then proceeds to operation 210, where any floor depth hypotheses 106 that are above the current position of the cameras 102 are removed from consideration. In this way, computing resources are not wasted evaluating floor depth hypotheses 106 that are above the user's head.

From operation 210, the routine 200 proceeds to operation 212, where a determination is made as to whether the number of remaining floor depth hypotheses 106 is less than a predefined value (e.g. 15) following the removal of the floor depth hypotheses 106 that are above the location of the cameras 102A and 102B. If the number of remaining floor depth hypotheses 106 is lower than the predefined value, the routine 200 proceeds from operation 212 to operation 214, where additional floor depth hypotheses 106 are generated, for example, below the lowest existing floor depth hypothesis 106. The additional floor depth hypotheses 106 can be generated in other locations in other configurations. The routine 200 then proceeds from operation 214 to operation 216. Similarly, if the number of remaining floor depth hypotheses 106 is not lower than the predefined value, the routine 200 proceeds from operation 212 to operation 216.

At operation 216, data identifying the angle, or position, of the cameras 102A and 102B is obtained from the sensor subsystem 120. The routine 200 then proceeds from operation 216 to operation 218, where a determination is made as to whether the angle of the cameras 102A and 102B is above a predefined angle (e.g. 75 degrees).

If the angle of the cameras 102A and 102B is above the predefined angle, this indicates that the user is not likely looking at the floor. The images 104A and 104B will not, therefore, be of assistance in identifying the floor. Accordingly, in this case the routine 200 proceeds from operation 218 back to operation 206, where a new pair of stereo images 104A and 104B are obtained and processed in the manner described herein. If the camera angle is below the predefined angle (e.g. 75 degrees), the routine 200 proceeds from operation 218 to operation 220.

At operation 220, a determination is made as to whether an analysis of another pair of stereo images taken at a similar pose and angle as the current images 104A and 104B resulted in the casting of a vote for a floor depth hypothesis 106. A vote for a particular candidate plane 106 indicates that a pair of stereo images 102 had the highest similarity score (described in detail below) when transformed with reference to the candidate plane 106 in the manner described below.

If an analysis of another pair of stereo images taken at a similar pose and angle as the current images 104A and 104B resulted in the casting of a vote for a floor depth hypothesis 106, there is no need to process the current images 104A and 104B. Accordingly, in this case the routine 200 proceeds from operation 222 back to operation 206, where a new pair of stereo images 104 are obtained and processed in the manner described herein. If an analysis of another pair of stereo images taken at a similar pose and angle as the current images 104A and 104B did not result in the casting of a vote for a floor depth hypothesis 106, the routine 200 proceeds from operation 222 to operation 224.

At operation 224, pixels in the images 104A and 104B corresponding to a camera angle greater than a predefined value (e.g. 75 degrees) are invalidated. In this manner, portions of the images 104A and 104B that are not likely to be of the floor are not analyzed in the manner described below. This can also prevent other horizontal planar surfaces, like tables, from being identified as the floor. The routine 200 then proceeds from operation 224 to operation 226.

At operation 226, a variable utilized to identify the current candidate plane 106 being considered is set to identify the first candidate plane 106 (e.g. where d=0). The routine 200 then proceeds from operation 226 to operation 228. At operation 228, the right image 104A is mapped onto the current candidate plane 106. As mentioned above, this results in a texture-mapped plane 112. The routine 200 then proceeds to operation 230.

At operation 230, the texture-mapped plane 112 is projected into the geometry of the left camera 102A, thereby creating an artificial right image 108. The routine 200 then proceeds from operation 230 to operation 232, where a score of image similarity between the right image 104A and the artificial right image 108 is computed. As discussed briefly above, NCC is utilized in some configurations to derive a score of the image similarity between the right image 104A and a corresponding artificial right image 108.

In one configuration, for example, a square window Wp is positioned at every pixel p, where ap denotes the intensity of pixel p in the artificial right image 108 and rp denotes its intensity in the right image 104A. $\bar{a}$ and $\bar{r}$ denote the mean intensity of Wp in the artificial right image 108 and the right image 104A, respectively. The NCC score at pixel p is computed as $$NCC(p) = \frac{\sum_{i \in W_p} (a_i - \bar{a})(r_i - \bar{r})}{\sqrt{\sum_{i \in W_p} (a_i - \bar{a})^2 \sum_{i \in W_p} (r_i - \bar{r})^2}}.$$

The NCC score over the whole image I is then computed as the average NCC score over all pixels, i.e., $$\text{score}(I) = \frac{\sum_{p \in I} NCC(p)}{|I|}.$$

NCC is utilized, in part, as this measurement is insensitive to illumination changes between left and right images, which is especially important in a large baseline camera setup such as that commonly present in VR devices 100. The size of the window Wp is set to 21×21 pixels in one configuration. Larger window sizes are preferable, as they reduce sensitivity to image noise and worsen NCC scores for objects whose orientation is not perpendicular to the gravity vector 110. Sliding windows can also be utilized to make the runtime for computing score(I) independent of the window size. As discussed, while NCC is utilized in some configurations, other mechanisms for computing a score of image similarity can be utilized in other configurations.

From operation 232, the routine 200 proceeds to operation 234, where a determination is made as to whether additional floor depth hypotheses 106 remain to be evaluated. If so, the routine 200 proceeds from operation 234 to operation 236, where the variable utilized to keep track of the current candidate plane 106 is incremented to identify the next floor depth hypothesis 106. The routine 200 then proceeds back to operation 228, described above. In this manner, a similarity score is generated for a pair of stereo images 104A and 104B for each candidate plane 106.

If no additional candidate planes 106 remain to be processed, the routine 200 proceeds from operation 234 to operation 237 where a determination is made as to whether a peak can be identified in an image similarity scores graph. Turning momentarily to FIGS. 3A and 3B, aspects of several example image similarity scores graphs 300A and 300B will be described. The image similarity scores graphs 300A and 300B include an x-axis 304 upon which the evaluated floor depth hypotheses 106 for a pair of images 104A and 104B are presented. In these examples, nine floor depth hypotheses 106 have been evaluated. Other numbers of floor depth hypotheses 106 can be evaluated per stereo image pair in other configurations. The y-axis 302 of the image similarity scores graphs 300A and 300B corresponds to the image similarity scores generated for the floor depth hypotheses 106 represented on the x-axis.

In the example image similarity scores graph 300A shown in FIG. 3A, the image similarity scores for the floor depth hypotheses 106 are all roughly the same. As a result, no peak can be identified and, consequently, the routine 200 will continue from operation 238 back to operation 206, where a new pair of images 104A and 104B can be obtained and processed in the manner described herein.

In the example image similarity scores graph 300B shown in FIG. 3B, the image similarity scores for the nine floor depth hypotheses 106 indicate a peak for the fifth floor depth hypothesis 106. Because a peak can be identified, the routine 200 will continue from operation 238 to operation 240, where a vote is cast for the candidate plane 106 for a pair of images 104A and 104B having the highest floor depth hypothesis 106 (e.g. the fifth floor depth hypothesis 106 in the example shown in FIG. 3B).

From operation 240, the routine 200 proceeds to operation 242, where a determination is made as to whether any candidate plane 106 has a predefined number of votes (e.g. three votes). If no candidate plane 106 has the predefined number of votes, the routine 200 proceeds from operation 242 back to operation 206, where another pair of images 104A and 104B can be obtained from a different position and processed in the manner described above.

If one or more candidate planes 106 have the predefined number of votes (or more), the routine 200 proceeds from operation 242 to operation 244. At operation 244, the candidate plane 106 having the highest similarity score is chosen as the plane of the floor. If there is more than candidate plane 106 that has the predefined number of votes, the candidate plane 106 having the lowest depth and the predefined number of votes is chosen as the floor.

The routine 200 then proceeds from operation 244 to 246, where the location of the floor (i.e. the distance between the chosen floor depth and the cameras 102A and 102B) can be reported to the sensor subsystem 120, for example, for use by other programs executing on the VR device 100. Several illustrative uses for the location of the floor were described above. From operation 246, the routine 200 proceeds back to operation 206, where the processing described above can be repeated in order to continually monitor the depth of the floor.

FIG. 4 shows example left and right stereo images taken by cameras 102A and 102B, respectively, in a VR device 100 or an AR device 500, along with aspects of the generation of an artificial right image 108 that is utilized for floor detection in configurations disclosed herein. As described above, and as illustrated in FIG. 4, due to the orientation of the cameras 102A and 102B, the images 104A and 104B show views of a scene taken from different angles. The images 104A and 104B do, however, include an overlapping portion 402B.

In this example, the left image 104B is texture mapped onto a candidate plane 106 (the correct candidate plane 106 in this example) and projected into the geometry of the right camera 102A, thereby creating an artificial left image 108. In this regard, it is to be appreciated that the artificial image 108 for the correct candidate plane 106 will match the right image 104A only for pixels corresponding to the real-world floor. Vertical surfaces like walls or windows in the artificial image 108 will look skewed and distorted, and will not match walls and windows in the right image 104A for any candidate plane 106.

The artificial left image 108 is then compared to the overlapping portion 402B of the right image 104A to determine the similarity between the real and artificial left images in the manner described above. This process is then repeated for each candidate plane 106, also in the manner described above. The process can repeat multiple times using different stereo image pairs in order to obtain an accurate measure of the floor depth.

Figure 5:
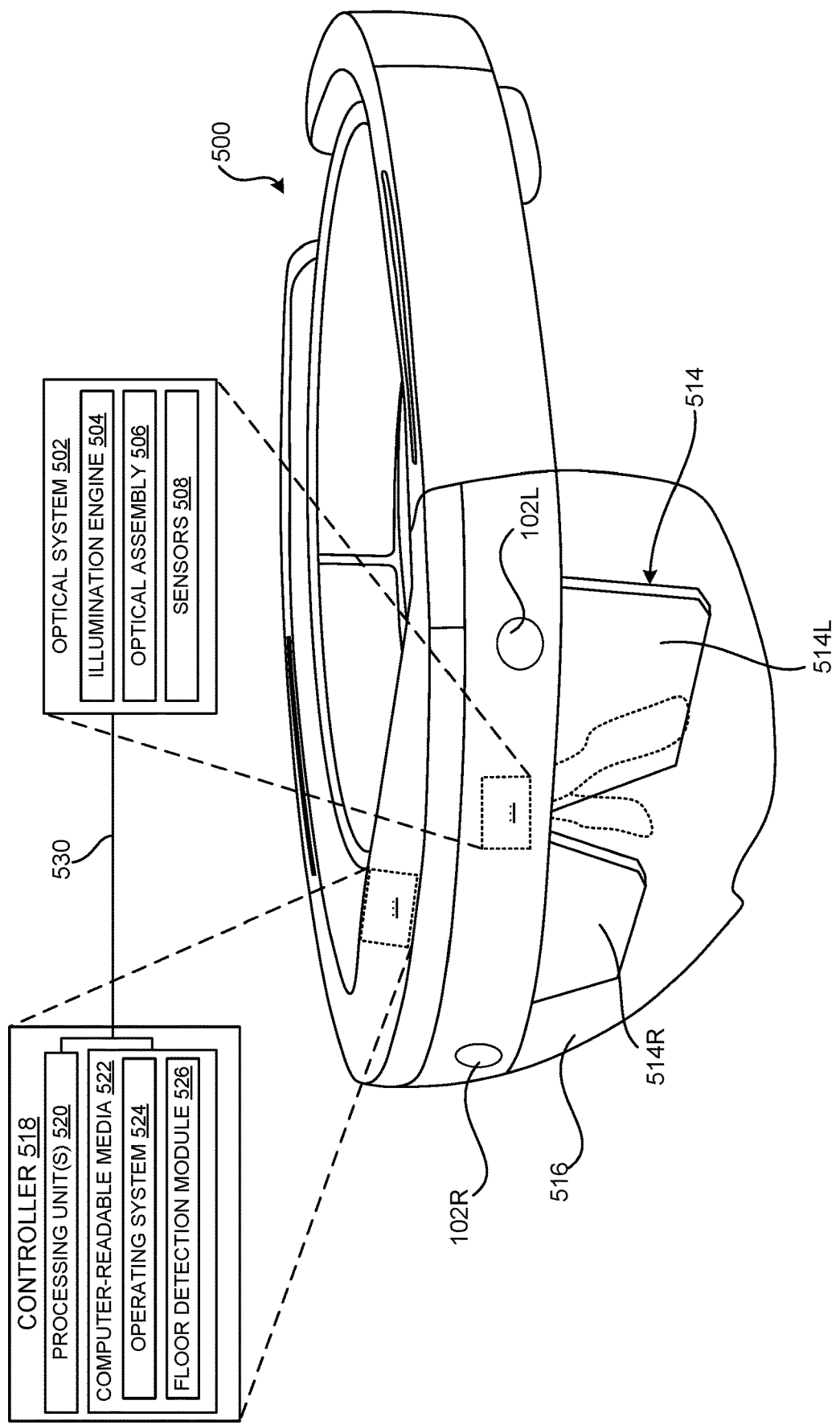
FIG. 5 is a computing device diagram showing aspects of the configuration of an AR device that can be utilized to implement the various configurations disclosed herein for floor detection using stereo images.

FIG. 5 is a computing device diagram showing aspects of the configuration of an AR device 500 that can be utilized to implement the various configurations disclosed herein for floor detection using stereo images. As described briefly above, AR devices superimpose CG images over a user's view of a real-world environment. For example, an AR device 500 such as that shown in FIG. 5 might generate composite views to enable a user to visually perceive a CG image superimposed over a visually perceived physical object that exists within a real-world environment.

In the example shown in FIG. 5, an optical system 502 includes an illumination engine 504 to generate electromagnetic ("EM") radiation, including some or all of the visible-light portion of the EM spectrum. In this example, the optical system 502 further includes an optical assembly 506 that is positioned to receive the EM radiation from the illumination engine 504 and to direct the EM radiation (or individual bandwidths thereof) along one or more predetermined optical paths. For example, the illumination engine 504 may emit the EM radiation into the optical assembly 506.

In some instances, a user experience is dependent on the AR device 500 accurately identifying characteristics of a physical object or plane (such as the real-world floor) and then generating the CG image in accordance with these identified characteristics. For example, suppose that the AR device 500 is programmed to generate a user perception that a virtual gaming character is running towards and ultimately jumping over a real-world structure. To achieve this user perception, the AR device 500 might obtain detailed data defining features of the real-world terrain around the AR device 500, such as the 3D plane defining the real-world floor.

In some examples, the AR device 500 utilizes an optical system 502 to generate a composite view (e.g., from a perspective of a user that is wearing the AR device 500) that includes both one or more CG images and a view of at least a portion of the real-world environment. For example, the optical system 502 might utilize various technologies such as, for example, AR technologies to generate composite views that include CG images superimposed over a real-world view. As such, the optical system 502 might be configured to generate CG images via an optical assembly 506 that includes a display panel 514.

In the illustrated example, the display panel includes separate right eye and left eye transparent display panels, labeled 514R and 514L, respectively. In some examples, the display panel 514 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment passes through the see-through display panel 514 to the eye or eyes of the user. Graphical content displayed by right-eye and left-eye display panels, if configured as see-through display panels, might be used to visually augment or otherwise modify the real-world environment viewed by the user through the see-through display panels 514. In this configuration, the user is able to view virtual objects that do not exist within the real-world environment at the same time that the user views physical objects within the real-world environment. This creates an illusion or appearance that the virtual objects are physical objects or physically present light-based effects located within the real-world environment.

In some examples, the display panel 514 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the AR device 500 further includes an additional see-through optical component, shown in FIG. 5 in the form of a transparent veil 516 positioned between the real-world environment and the display panel 514. It can be appreciated that the transparent veil 516 might be included in the AR device 500 for purely aesthetic and/or protective purposes.

The AR device 500 might further include various other components (not all of which are shown in FIG. 5), for example, front-facing cameras 102 (e.g. RGB, B&W, or IR cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver and, potentially, other types of sensors. Data obtained from one or more sensors 508, some of which are identified above, can be utilized to determine the orientation, location, and movement of the AR device 500.

In the illustrated example, the AR device 500 includes one or more logic devices and one or more computer memory devices storing instructions executable by the logic device(s) to implement the functionality disclosed herein. In particular, a controller 518 can include one or more processing units 520, one or more computer-readable media 522 for storing an operating system 524, other programs (such as a floor detection module 526 configured to detect the depth of a real-world floor in the manner disclosed herein), and data.

In some implementations, the AR device 500 (and MR devices) is configured to analyze data obtained by the sensors 508 to perform feature-based tracking of an orientation of the AR device 500. For example, in a scenario in which the object data includes an indication of a stationary object within the real-world environment (e.g., a table), the AR device 500 might monitor a position of the stationary object within a terrain-mapping field-of-view ("FOV"). Then, based on changes in the position of the stationary object within the terrain-mapping FOV and a depth of the stationary object from the AR device 500, the AR device 500 might calculate changes in the orientation of the AR device 500.

It can be appreciated that these feature-based tracking techniques might be used to monitor changes in the orientation of the AR device 500 for the purpose of monitoring an orientation of a user's head (e.g., under the presumption that the AR device 500 is being properly worn by a user). The computed orientation of the AR device 500 can be utilized in various ways, some of which have been described above.

The processing unit(s) 520, can represent, for example, a central processing unit ("CPU")-type processing unit, a graphics processing unit ("GPU")-type processing unit, a field-programmable gate array ("FPGA"), one or more digital signal processors ("DSPs"), or other hardware logic components that might, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 522, can store instructions executable by the processing unit(s) 520, such as instructions which, when executed, compute the depth of a real-world floor in the manner disclosed herein. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Example Clauses

The disclosure presented herein also encompasses the subject matter set forth in the following clauses:

Clause 1. A computer-implemented method for identifying a first three-dimensional (3D) plane corresponding to a floor and being perpendicular to a gravity vector, the method comprising: receiving a first image (104A) taken at a first location and a second image (104B) taken at a second location different from the first location; evaluating a plurality of second 3D planes (106) perpendicular to the gravity vector by mapping the first image (104A) onto a second 3D plane (106) to create a texture-mapped 3D plane (112), the second 3D plane (106) being perpendicular to the gravity vector (110), projecting the texture-mapped 3D plane (112) into a geometry of a camera (102B) used to generate the second image (104B) to create an artificial second image (108), and computing a score of image similarity based upon a similarity between the second image (104B) and the artificial second image (108); and selecting one of the plurality of second 3D planes (106) having a highest score of image similarity between the second image (104B) and the artificial second image (108) as the first 3D plane corresponding to the floor.

Clause 2. The computer-implemented method of clause 1, wherein the first image is taken by a first camera and the second image is taken by a second camera.

Clause 3. The computer-implemented method of any of clauses 1 and 2, wherein the first image and the second image are taken by a first camera.

Clause 4. The computer-implemented method of any of clauses 1-3, wherein second 3D planes of the plurality of second 3D planes having a location above the first location or above the second location are not evaluated.

Clause 5. The computer-implemented method of any of clauses 1-4, further comprising invalidating pixels in the first image and the second image where an angle of the first camera or the second camera is greater than a predetermined angle.

Clause 6. The computer-implemented method of any of clauses 1-5, wherein the score of image similarity is generated using normalized cross correlation (NCC).

Clause 7. The computer-implemented method of any of clauses 1-6, further comprising repeating the receiving, evaluating, and selecting operations for a plurality of first images and a plurality of second images.

Clause 8. A device, comprising: a first camera (102A); a processor (130); and a computer storage medium having instructions stored thereupon which, when executed by the processor, cause the device to: evaluate a plurality of candidate 3D planes (106) perpendicular to a gravity vector (110) by: mapping a first image (104A) taken by the first camera onto a candidate 3D plane (106) to create a texture-mapped 3D plane (112); creating an artificial second image (108) from the texture-mapped 3D plane (112); and determining a similarity between a second image (104B) and the artificial second image (108); and select one of the candidate 3D planes (106) as corresponding to a floor based upon the similarity.

Clause 9. The device of clause 8, wherein the second image is generated by the first camera.

Clause 10. The device of any of clauses 8 and 9, wherein the device further comprises a second camera and wherein the second image is generated by the second camera.

Clause 11. The device of any of clauses 8-10, wherein the artificial second image is created by projecting the texture-mapped 3D plane into a geometry of the second camera.

Clause 12. The device of any of clauses 8-11, wherein candidate 3D planes of the plurality of candidate 3D planes having a location above a location of the first camera are not evaluated.

Clause 13. The device of any of clauses 8-12, wherein the computer storage medium has further instructions stored thereupon to repeat the evaluating and selecting operations for a plurality of first images and a plurality of second images.

Clause 14. The device of any of clauses 8=13, wherein the similarity between the second image and the artificial second image is computed using normalized cross correlation (NCC).

Clause 15. A computer-implemented method, comprising: for candidate three-dimensional (3D) planes in a plurality of candidate 3D planes (106) perpendicular to a gravity vector (110): mapping a first image (104A) onto a candidate 3D plane (106) to create a texture-mapped 3D plane (112); projecting the texture-mapped 3D plane (112) into a geometry of a camera (102B) used to generate a second image (104B) to create an artificial second image (108); computing a similarity score for the second image (104B) and the artificial second image (108); and casting votes for the candid 3D planes based upon the similarity scores; and selecting one of the candidate 3D planes (106) as corresponding to a floor based, at least in part, upon the cast votes.

Clause 16. The computer-implemented method of clause 15, wherein the first image is generated by a first camera at a first location and the second image is generated by the first camera at a second location.

Clause 17. The computer-implemented method of any of clauses 15 and 16, wherein the first image and the second image are generated by a first camera.

Clause 18. The computer-implemented method of any of clauses 15-17, wherein the artificial second image is created by projecting the texture-mapped 3D plane into a geometry of the second camera.

Clause 19. The computer-implemented method of any of clauses 15-18, further comprising repeating the evaluating and selecting operations for a plurality of first images and a plurality of second images.

Clause 20. The computer-implemented method of any of clauses 15-19, wherein the mapping, projecting, and computing operations are not performed if an analysis of a third image and a fourth image taken at a similar pose and angle as the first image and the second image resulted in a vote being cast for one of the candidate 3D planes.

Based on the foregoing, it should be appreciated that technologies for detecting a real-world floor using stereo images have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the claims below.

What is claimed is:

1. A computer-implemented method for identifying a first three-dimensional (3D) plane corresponding to a floor and being perpendicular to a gravity vector, the method comprising:
   receiving a first image taken at a first location and a second image taken at a second location different from the first location;
   evaluating a plurality of second 3D planes perpendicular to the gravity vector by
      mapping the first image onto a second 3D plane to create a texture-mapped 3D plane, the second 3D plane being perpendicular to the gravity vector,
      creating an artificial second image from the texture-mapped 3D plane, and
      computing a score of image similarity based upon a similarity between the second image and the artificial second image; and
   selecting one of the plurality of second 3D planes having a highest score of image similarity between the second image and the artificial second image as the first 3D plane corresponding to the floor.

2. The computer-implemented method of claim 1, wherein the first image is taken by a first camera and the second image is taken by a second camera.

3. The computer-implemented method of claim 1, wherein the first image and the second image are taken by a first camera.

4. The computer-implemented method of claim 1, wherein second 3D planes of the plurality of second 3D planes having a location above the first location or above the second location are not evaluated.

5. The computer-implemented method of claim 1, further comprising invalidating pixels in the first image and the second image where an angle of the first camera or the second camera is greater than a predetermined angle.

6. The computer-implemented method of claim 1, wherein the score of image similarity is generated using normalized cross correlation (NCC).

7. The computer-implemented method of claim 1, further comprising repeating the receiving, evaluating, and selecting operations for a plurality of first images and a plurality of second images.

8. A device, comprising:
   a first camera;
   a processor; and
   a computer storage medium having instructions stored thereupon which, when executed by the processor, cause the device to:
      evaluate a plurality of candidate 3D planes perpendicular to a gravity vector by:
         mapping a first image taken by the first camera onto a candidate 3D plane to create a texture-mapped 3D plane;
         creating an artificial second image from the texture-mapped 3D plane; and
         determining a similarity between a second image and the artificial second image; and
      select one of the candidate 3D planes as corresponding to a floor based upon the similarity.

9. The device of claim 8, wherein the second image is generated by the first camera.

10. The device of claim 8, wherein the device further comprises a second camera and wherein the second image is generated by the second camera.

11. The device of claim 8, wherein the artificial second image is created by projecting the texture-mapped 3D plane into a geometry of the second camera.

12. The device of claim 8, wherein candidate 3D planes of the plurality of candidate 3D planes having a location above a location of the first camera are not evaluated.

13. The device of claim 8, wherein the computer storage medium has further instructions stored thereupon to repeat the evaluating and selecting operations for a plurality of first images and a plurality of second images.

14. The device of claim 8, wherein the similarity between the second image and the artificial second image is computed using normalized cross correlation (NCC).

15. A computer-implemented method, comprising:
   for candidate three-dimensional (3D) planes in a plurality of candidate 3D planes perpendicular to a gravity vector:
      mapping a first image onto a candidate 3D plane to create a texture-mapped 3D plane;
      creating an artificial second image from the texture-mapped 3D plane;
      computing a similarity score for the second image and the artificial second image; and
      casting votes for the candid 3D planes based upon the similarity scores; and
   selecting one of the candidate 3D planes as corresponding to a floor based, at least in part, upon the cast votes.

16. The computer-implemented method of claim 15, wherein the first image is generated by a first camera at a first location and the second image is generated by the first camera at a second location.

17. The computer-implemented method of claim 15, wherein the first image and the second image are generated by a first camera.

18. The computer-implemented method of claim 15, wherein the artificial second image is created by projecting the texture-mapped 3D plane into a geometry of the second camera.

19. The computer-implemented method of claim 15, further comprising repeating the evaluating and selecting operations for a plurality of first images and a plurality of second images.

20. The computer-implemented method of claim 15, wherein the mapping, projecting, and computing operations are not performed if an analysis of a third image and a fourth image taken at a similar pose and angle as the first image and the second image resulted in a vote being cast for one of the candidate 3D planes.

* * * * *